(12) United States Patent
Baek

(10) Patent No.: US 9,413,969 B2
(45) Date of Patent: Aug. 9, 2016

(54) AUTOMATIC IMAGE PROCESSING METHOD AND ELECTRONIC DEVICE THEREOF

(71) Applicant: Samsung Electronics Co., Ltd., Suwon-si, Gyeonggi-do (KR)

(72) Inventor: In-Ho Baek, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/282,335

(22) Filed: May 20, 2014

(65) Prior Publication Data

US 2015/0066511 A1    Mar. 5, 2015

(30) Foreign Application Priority Data

Aug. 30, 2013  (KR) .................. 10-2013-0104367

(51) Int. Cl.
| | | |
|---|---|---|
| *G10L 13/08* | (2013.01) | |
| *H04N 5/232* | (2006.01) | |
| *H04M 1/04* | (2006.01) | |
| *G06K 9/20* | (2006.01) | |
| *G06K 9/22* | (2006.01) | |
| *H04N 5/225* | (2006.01) | |

(52) U.S. Cl.
CPC .......... *H04N 5/23293* (2013.01); *G06K 9/2081* (2013.01); *G06K 9/22* (2013.01); *H04M 1/04* (2013.01); *H04N 5/2251* (2013.01); *G06K 2209/01* (2013.01); *H04M 2250/52* (2013.01)

(58) Field of Classification Search
CPC .... G10L 13/027; H04M 1/04; H04N 5/23293
USPC ............... 704/235, 238, 253, 260, 270.1, 271
See application file for complete search history.

(56) References Cited

U.S. PATENT DOCUMENTS

| | | | |
|---|---|---|---|
| 6,229,961 B1* | 5/2001 | Torikoshi et al. ................ 396/71 |
| 2004/0186357 A1* | 9/2004 | Soderberg et al. ............. 600/300 |
| 2007/0216918 A1* | 9/2007 | Honeck et al. .................. 358/1.9 |
| 2009/0295181 A1* | 12/2009 | Lawlor ...................... B60R 1/12 |
| | | | 296/1.11 |
| 2012/0155454 A1* | 6/2012 | Eichen .................... H04L 12/66 |
| | | | 370/352 |
| 2013/0076674 A1* | 3/2013 | Lee ............................... 345/173 |
| 2014/0176690 A1* | 6/2014 | Hamel et al. .................... 348/63 |

FOREIGN PATENT DOCUMENTS

| | | |
|---|---|---|
| KR | 10-2011-0017615 A | 2/2011 |
| KR | 10-2011-0071834 A | 6/2011 |
| KR | 10-2011-0078051 A | 7/2011 |
| KR | 10-2013-0003666 A | 1/2013 |

* cited by examiner

*Primary Examiner* — Marcellus Augustin
(74) *Attorney, Agent, or Firm* — Jefferson IP Law, LLP

(57) ABSTRACT

A method and an electronic device for processing an image in an electronic device are provided. The method includes determining whether the electronic device is mounted in a cradle comprising at least one guide region, scanning an image in the guide region using a camera, and outputting the scanned image or image information based on the scanned image. The method can easily process the image and provide the user with the output information. Therefore, the output information is favorable to the blind people or the illiterate, and the usability and the reliability of the electronic device can be enhanced.

17 Claims, 18 Drawing Sheets

AUTOMATIC IMAGE PROCESSING METHOD AND ELECTRONIC DEVICE THEREOF

CROSS-REFERENCE TO RELATED APPLICATION(S)

This application claims the benefit under 35 U.S.C. §119 (a) of a Korean patent application filed on Aug. 30, 2013 in the Korean Intellectual Property Office and assigned Serial number 10-2013-0104367, the entire disclosure of which is hereby incorporated by reference.

TECHNICAL FIELD

The present disclosure relates to an electronic device. More particularly, the present disclosure relates to a method and an electronic device for processing an image.

BACKGROUND

As electronic industries advance, various electronic devices such as mobile phone, tablet Personal Computer (PC), multimedia player, palm console, Personal Digital Assistant (PDA), Global Positioning System (GPS) navigation device, and remote controller become necessary, and people frequently use the electronic devices to provide diverse functions such as web surfing, information output, and image capturing and processing.

The electronic device can include at least one camera including a corresponding imaging device. The camera captures a still picture and a moving picture and edits the captured image in various fashions.

Meanwhile, the electronic device enhances the image processing in various ways, but does not consider the image processing for blind people.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for processing an image in an electronic device includes determining whether the electronic device is mounted in a cradle comprising at least one guide region, scanning an image in the guide region using a camera, and outputting the scanned image or image information based on the scanned image.

In accordance with an aspect of the present disclosure, an electronic device is provided. The electronic device includes a camera, a cradle comprising at least one guide region to be captured by the camera when the electronic device is mounted to the cradle, and a processor configured to scan an image in the guide region using the camera and to output the scanned image or image information based on the scanned image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
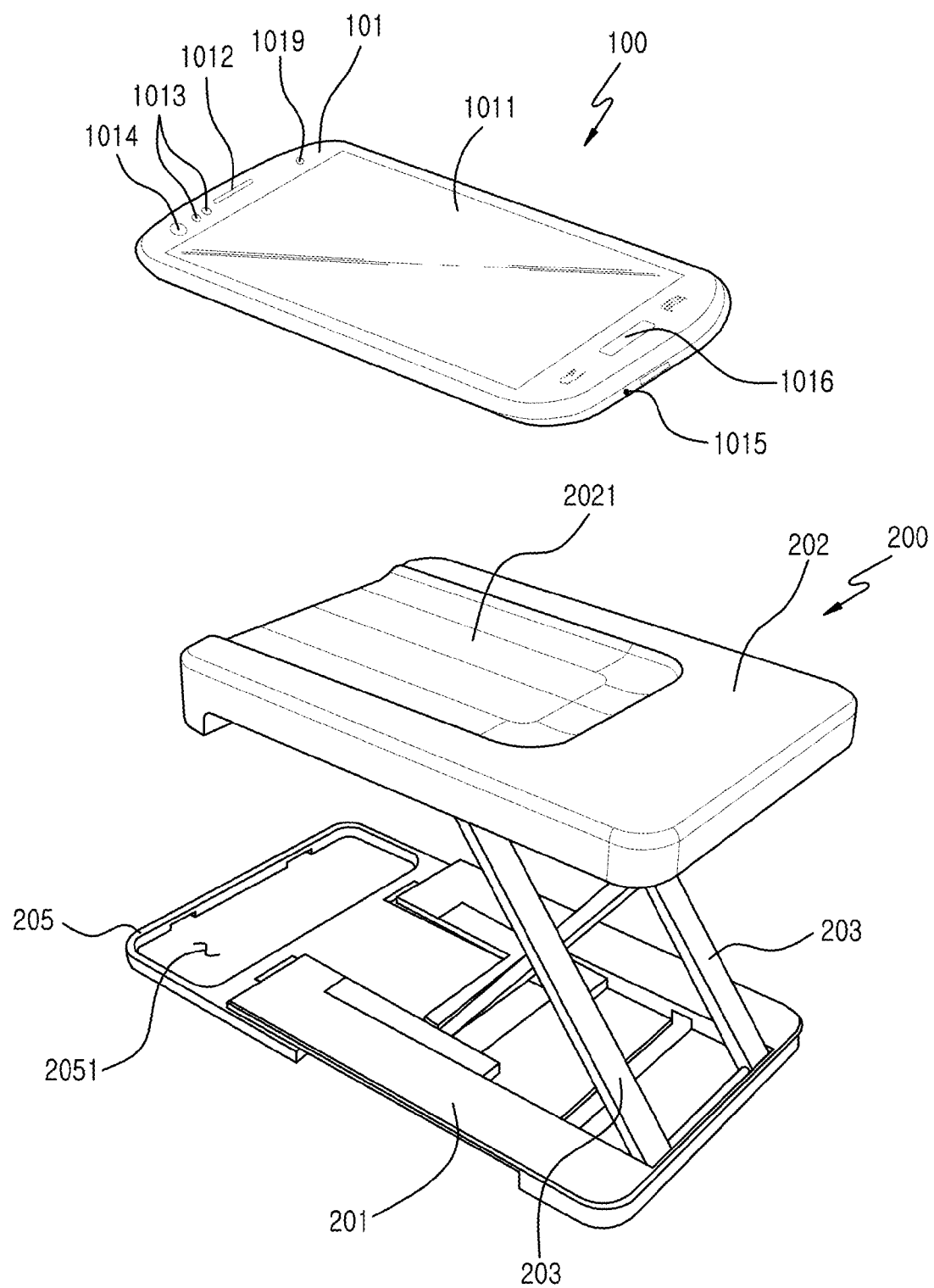
FIG. 1 is a perspective view of an electronic device including a cradle according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A method for processing an image in an electronic device can determine whether the electronic device is mounted in a cradle including at least one guide region, scanning an image in the guide region using a camera, and outputting the scanned image or image information.

The electronic device can determine it is mounted in the cradle by a sensor of the electronic device that detects a target of the cradle. The target can be at least one magnet, and the sensor can be a hall sensor or a reed switch for detecting magnetic force of the magnet.

The method can further include, after scanning the image in the guide region, converting a text of the scanned image to text data using an Optical Character Reader (OCR) function.

The method can further include, after converting the image to the text data, converting the converted text data to voice data using a Text to Speech (TTS) function.

The outputting of the scanned image or the image information can include displaying a corresponding image or image information on a display of the electronic device.

The displayed image or image information can be changed and output in a preset size.

The outputting of the scanned image or the image information can include audibly or tactually outputting a corresponding image or data corresponding to the image information on a display of the electronic device.

The corresponding data can be output as voice or sound through a speaker.

The corresponding data can be output as vibration through a vibrator.

The method can further include, after determining whether the electronic device is mounted in the cradle, confirming at least one of a distance between the camera and the guide region, an angle, an amount of light of a lighting device, a recognition range setting value, and a camera resolution setting value, which are preset and scanning the image in the guide region using the camera based on the confirmed information.

The method can further include, when the scanned image is color data, comparing the scanned color data with a color of the guide frame of the cradle including the guide region, correcting the scanned color data based on the comparison, and displaying the color data based on the correction on a display of the electronic device.

The electronic device can further include a display for displaying the image or image information.

The electronic device can further include a speaker for audibly outputting the image or information corresponding to the image information.

The electronic device can further include a vibrator for tactually outputting the image or information corresponding to the image information.

The electronic device can further include a sensor for automatically scanning the image by detecting a magnetic force of at least one magnet of the cradle.

The electronic device can include at least one camera, a cradle including at least one guide region to be captured by the camera when the electronic device is mounted, at least one processor for scanning an image in the guide region using the camera, and outputting the scanned image or image information.

The processor can convert a text of the scanned image to text data using an OCR function.

The processor can convert the converted text data to voice data using a TTS function.

The cradle can include a lower support, a guide frame including at least one hollow guide region in the lower support, an upper support installed at a certain height from the lower support and including a mounting part for receiving the electronic device, and at least one leg for interconnecting the upper support and the lower support.

The guide frame can be replaced by another guide frame including a guide region in various shapes and numbers.

Herein, an electronic device is explained based on a touch screen capable of receiving input through an input device and displaying through a single screen through the display part. The term "display part" can be replaced by "display". Accordingly, the display and the input device are described separately, the display may include the input device or the input device may be referred to as the display. Notably, the display can be referred to as the touch screen (device).

The present disclosure is not limited to the electronic device including the touch screen and is also applicable to various electronic devices. For example, the present disclosure can be applied to an electronic device which physically separates the display and the input device.

Herein, the electronic device includes, but not limited to, the touch screen as the display and at least one camera for capturing a subject. For example, the electronic device can employ various devices including the touch screen, i.e., a Personal Digital Assistant (PDA), a laptop computer, a mobile phone, a smart phone, a netbook, a Mobile Internet Device (MID), an Ultra Mobile Personal Computer (UMPC), a tablet Personal Computer (PC), a navigation device, and a multimedia player.

FIG. 1 is a perspective view of an electronic device including a cradle according to an embodiment of the present disclosure.

Figure 2:
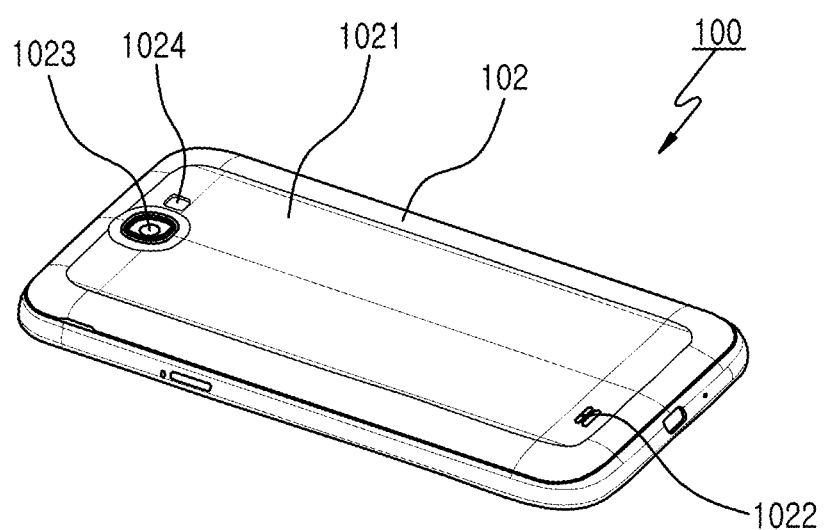
FIG. 2 is a perspective view of a rear side of the electronic device according to an embodiment of the present disclosure.

FIG. 2 is a perspective view of a rear side of the electronic device according to an embodiment of the present disclosure.

Referring to FIGS. 1 and 2, a front side 101 of the electronic device 100 includes a display 1011. A speaker 1012 for receiving another party's voice is disposed above the display 1011 and a microphone 1015 for sending a user's voice to the other party is disposed below the display 1011. Hence, the electronic device 100 can provide a basic communication function.

Components for various functions of the electronic device 100 can be placed proximate to the speaker 1012 of the electronic device 100. Such components can include a Video Telephony (VT) camera 1014 for a VT call with the other party. Depending on a surrounding environment, the electronic device 100 can include a sensor module 1013 for variably controlling the electronic device 100. The sensor module 1013 can include a light sensor for detecting ambient light and automatically adjusting a brightness of the display 1011 based on the detected light value and/or a proximity sensor for deactivating the display 1011 when detecting proximity to the user's head during the call. The components may include a service Light Emitting Diode (LED) 1019 disposed in a side of the speaker 1012 and notifying various status information of the electronic device 100 to the user. The front side 101 of the electronic device 100 may include a physical key button 1016. The electronic device 100 can include other various mechanical structures (not shown).

A rear side 102 of the electronic device 100 can include a battery cover 1021. The rear side 102 of the electronic device 100 can include an external speaker 1022 for outputting voice or sound through the electronic device 100. The rear side 102 of the electronic device 100 can include at least one camera 1023 for capturing an external subject. An LED module 1024 may be disposed proximate to the camera 1023 for providing light to the image capture subject.

The electronic device 100 can include a cradle 200. The cradle 200 accommodates the electronic device 100 thereon and can capture an image of a subject (e.g., image, character, or numeral written on a document) under the cradle 200 by driving the camera 1023. The electronic device 100 can be attached and detached at a certain height of the cradle 200. After mounted to the cradle 200, the camera 1023 and auxiliary devices relating to the camera 1023 may automatically operate. For example, after the electronic device 100 is mounted in the cradle 200, the camera 1023 may operate and any related programs may automatically run.

The cradle 200 can include an upper support 202 for holding the electronic device 100, a lower support 201 separated from the upper support 202 at a certain distance, and at least one leg 203 supported by the lower support 201 to thus support the upper support 202.

The upper support 202 can include a mounting part 2021 is recessed to be lower than a top side of the upper support 202. For example, the mounting part 2021 can have a width and a depth for accommodating the electronic device 100. The mounting part 2021 can receive the electronic device 100 so as to contact a surface of a corresponding region of the electronic device 100 such that the contact excludes the camera 1023 at the rear side 102 of the electronic device 100 and any associated peripherals. The mounting part 2021 may further include a locking mechanism for preventing movement of the electronic device 100 after the electronic device 100 is mounted.

The lower support 201 includes a hollow guide frame 205 at one distal end. A guide region 2051, which is the hollow portion of the guide frame 205, may correspond to an imaging area captured by the camera 1023 of the electronic device 100 placed. The guide frame 205 including the guide region 2051 can be integrally formed with the lower support 201 or detachable from the lower support 201. When the guide frame 205 is detachable from the lower support 201, at least one guide frame including the guide region in various shapes can replace it.

The leg 203 may be linked and folded. When the leg 203 is folded and the upper support 202 and the lower support 201 are not used as the cradle 200, the two supports 202 and 201 may be collapsed to reduce their volume. The leg 203 may further include a holding means for holding the upper support 202 separate from the lower support 201.

When the electronic device 100 is mounted in the cradle 200, the camera 1023 at the rear side 102 of the electronic device 100 can only image a subject in the guide region 2051 of the guide frame 205 of the lower support 201. The image capture subject can include characters, numerals, and an image on a document. The subject can include at least one color in the corresponding guide region. The electronic device 100 can display captured image information corresponding to the guide region 2051 that is scanned by the camera 1023 on the display. The electronic device 100 may display processed information of the captured image information corresponding to the guide region 2051 that is scanned by the camera 1023 on the display. The processed information can include text data converted using an OCR based on the captured image. The processed information can magnify or demagnify the read captured with a certain magnification amount. The processed information can include color correction information which reflects comparison of the scanned color and a reference color of the guide frame 205.

The image acquisition and the processing of the acquired image or the acquired image information are described in detail.

Figure 3:
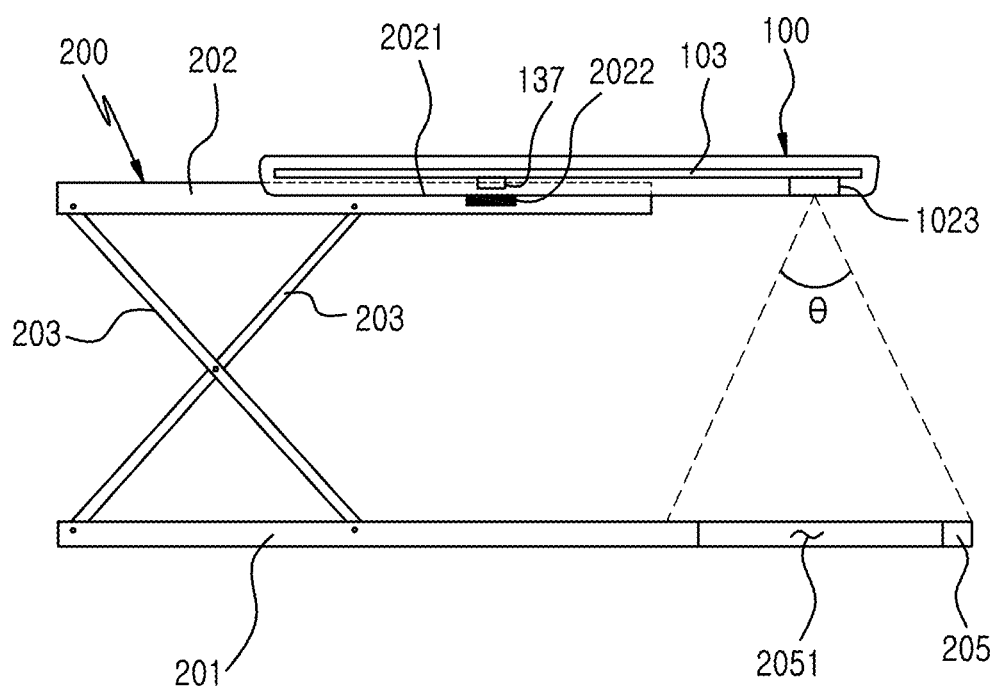
FIG. 3 is a cross-sectional view of the electronic device mounted in the cradle according to an embodiment of the present disclosure.

FIG. 3 is a cross-sectional view of the electronic device mounted in the cradle according to an embodiment of the present disclosure.

Figure 4:
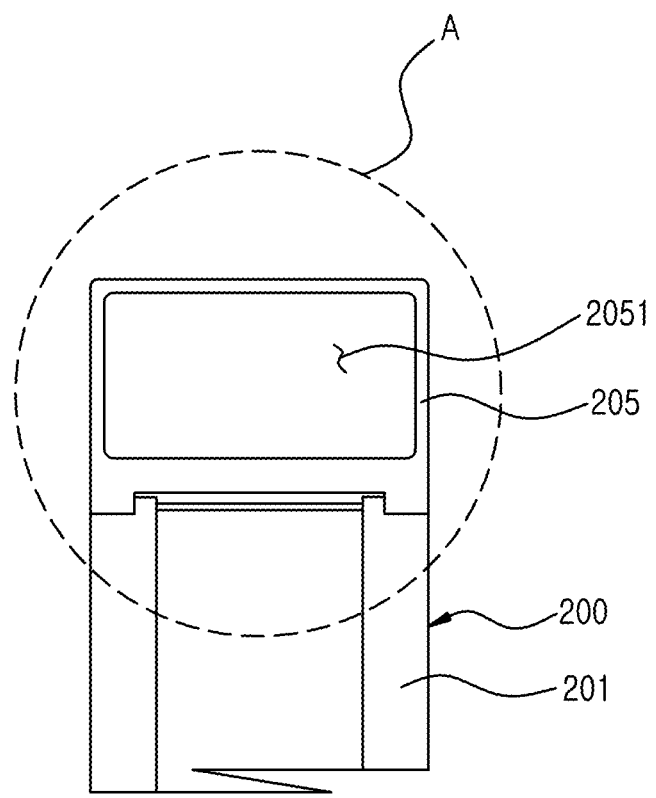
FIG. 4 is a view of a guide frame of the cradle in an imaging area of a camera of the electronic device according to an embodiment of the present disclosure.

FIG. 4 is a view of a guide frame of the cradle in an imaging area of the camera of the electronic device according to an embodiment of the present disclosure.

Referring to FIGS. 3 and 4, the electronic device 100 can be mounted on the mounting part 2021 of the upper support 202 of the cradle 200. The electronic device 100 mounted on the mounting part 2021 can automatically detect its mounting in the cradle 100. The electronic device 100 can include a sensing mechanism and a target for detecting the sensing mechanism at a position corresponding to the sensing mechanism of the mounting part 2021. The target in the mounting part 2021 can include a magnet 2022 having a magnetic force. The sensing mechanism can include a hall sensor 137 or a reed switch. When the electronic device 100 is mounted on the mounting part 2021 of the cradle 200, the electronic device 100 can automatically start the camera 1023 according to the sensing information of the hall sensor 1037, which detects the magnetic force of the magnet 2022. The electronic device 100 can turn on and off the lighting device such as LED module according to the sensing information. The electronic device 100 may start the camera 1023 and concurrently activate the OCR function according to the sensing information. The electronic device 100 may activate a TTS function for converting the text data converted in an OCR mode to voice according to the sensing information. The electronic device 100 may automatically output the voice data converted by the TTS function through the speaker according to the sensing information. The electronic device 100 may activate those functions and concurrently display the corresponding image or image information.

The camera 1023 can have an angle of view $\theta$. The guide region 2051 of the guide frame 205 of the lower support 201 can be included in the imaging area A based on the angle of view $\theta$ of the camera 1023.

Figure 5:
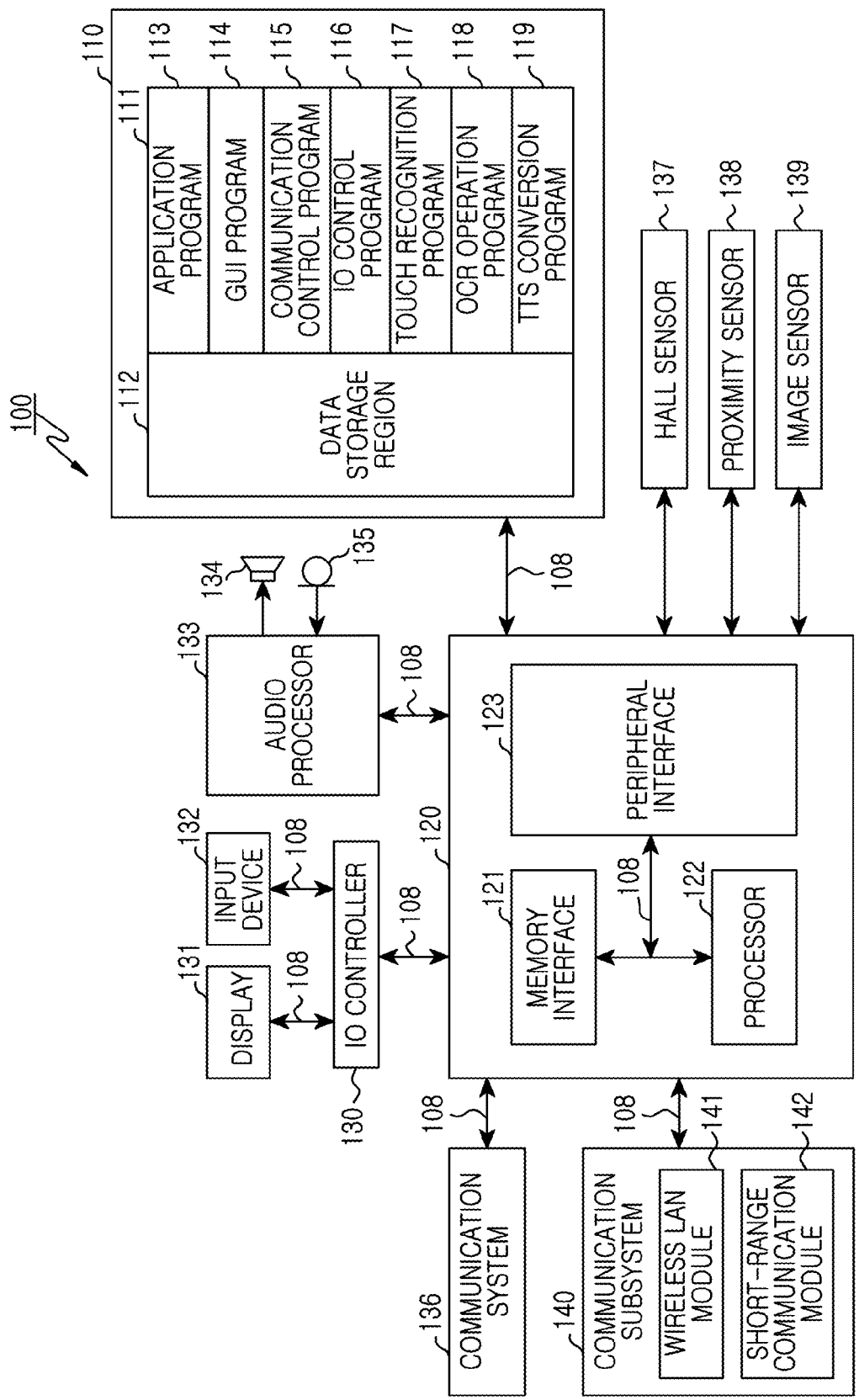
FIG. 5 is a block diagram of the electronic device according to an embodiment of the present disclosure.

FIG. 5 is a block diagram of the electronic device according to an embodiment of the present disclosure.

Referring to FIG. 5, the electronic device 100 can include a memory 110, a processor unit 120, an Input Output (IO) controller 130, a display 131, an input device 132, an audio processor 133, a communication system 136, and a communication subsystem 140. These components can communicate with each other through one or more communication buses or signal lines 108.

Now, the components will be explained individually.

The memory 110 includes a program storage region 111 for storing a program to control operations of the electronic device 100, and a data storage region 112 for storing data generated during the program execution. The memory 110 can store data generated by the program in a processor 122.

For example, the data storage region 112 can store database information used to determine programs that are executed by the processor 122 through a touch recognition control program 117 and can store information for displaying a Graphic User Interface (GUI) on the display 131. The data storage region 112 can store an image scanned by the camera or the image processed information. The processed information can be text information that is converted from the scanned image. The processed information can be the reference color information of the guide frame for correcting the color scanned by the camera.

The program storage region 111 can include an application program 113, a GUI program 114, a communication control program 115, an IO control program 116, the touch recognition control program 117, an OCR operation program 118, and a TTS conversion program 119. Herein, the program contained in the program storage region 111 may be referred as an instruction set, which is a set of instructions that the processor 122 may execute.

The application program 113 can include a software component for at least one application program installed in the electronic device 100.

The GUI program 114 can include at least one software component for providing the GUI on the display 131. For example, the GUI program 114 may display application program information driven by the processor 122 on the display 131.

The electronic device 100 can display the captured image or the image information corresponding to the guide region 2051 of the guide frame 205.

The communication control program 115 can include at least one software component for controlling communication with one or more other electronic devices using the communication system 136 and/or the communication subsystem 140. For example, the communication control program 115 can scan for other electronic device to communicate with. Upon scanning for other electronic device, the communication control program 115 forms a connection with the other electronic device to perform communication functions. Next, the communication control program 115 may send and receive data to and from the other electronic device through the communication system 136 by performing capability discovery and session establishment.

The IO control program 116 can display the operation of the electronic device 100 on the display 131 and can receive a command for the electronic device 100 through the input device 132.

Under control of the processor 122, the touch recognition control program 117 can move, store, magnify, or demagnify the image information displayed on the display according to a touch input.

The electronic device 100 can include one or more memories 110. Accordingly, the memory 110 may function as the program storage region 111 and/or the data storage region 112 alone. A physical internal area of the memory 110 may not be distinctly divided according to device characteristics.

The processor unit 120 can include a memory interface 121, at least one processor 122, and a peripheral interface 123. Herein, the memory interface 121, the at least one processor 122, and the peripheral interface 123 of the processor unit 120 can be integrated onto at least one integrated circuit or implemented using separate components.

The memory interface 121 can control access of the component such as processor 122 or peripheral interface 123 to the memory 110.

The peripheral interface 123 can control the connection between an IO peripheral of the electronic device 100 and the processor 122 and the memory interface 121.

The processor 122 controls the electronic device 100 to provide various multimedia and communication services using at least one software program, controls the IO processor 130 to display the GUI of the electronic device 100 on the display 131, and receives the command input from the input device 132. In so doing, the processor 122 can execute at least one program stored in the memory 110 and provide the service corresponding to the program.

The processor 122 may receive sensing information of the electronic device 100 when mounted in the cradle from, for example, the hall sensor 137 of a plurality of sensors of the electronic device 100 and activate the camera and any peripheral such as the LED module. The processor may also concurrently start the OCR operation program. According to the sensing information of the hall sensor 137, the processor 122 can run the TTS conversion program for converting the text data converted by the OCR operation program to the voice. According to the sensing information of the hall sensor 137, the processor 122 may forward the voice data converted by the TTS conversion program to the audio processor 133 to output the voice data through the speaker. According to the sensing information of the hall sensor 137, the processor 122 may acquire the color corresponding to the guide region 2051 of the guide frame 205, correct the color by comparing the acquired color with the reference color of the guide frame 205 stored to the data storage, and display the corrected color on the display.

According to the sensing information of the hall sensor 137, the processor 122 may automatically execute such various functions. The processor 122 may automatically execute various functions based on at least one of a distance between the camera 1023 and the guide region 2051, an angle, an amount of light of the lighting device, a recognition range setting value, and a camera resolution setting value, which are stored in the data storage region.

The audio processor 133 can provide an audio interface between the user and the electronic device 100 through the speaker 134 and a microphone 135. Under the control of the processor 122, the audio processor 133 can forward the voice data converted by the TTS conversion program to the speaker.

Under the control of the processor 122, the communication system 136 can connect the electronic device 100 to the other electronic device using one or more antennas. The communication system 136 sends and receives a voice call, a video call, a Short Message Service (SMS), a Multimedia Message Service (MMS), and a radio signal for data communication, to and from a terminal such as smart phone having a phone number input to the electronic device 100, a tablet PC, or other mobile device.

The communication subsystem 140 can include a wireless Local Area Network (LAN) module 141 and a short-range communication module 142. Under the control of the processor 122, the wireless LAN module 141 can access wireless Internet via an Access Point (AP). The wireless LAN module 141 supports any suitable wireless LAN standard provided by the Institute of Electrical and Electronics Engineers (IEEE) such as 802.11 ac. Under the control of the processor 122, the short-range communication module 142 can conduct short-range wireless communication between the electronic device 100 and an external device. The short-range communication can include Bluetooth, Infrared Data Association (IrDA), Near Field Communication (NFC), and so on.

The IO processor 130 can provide an interface between an IO device such as display 131 and input device 132, and the peripheral interface 123.

The input device 132 can provide a user's input data to the processor unit 120 via the IO processor 130. For example, the input device 132 can include only a control button for controlling the electronic device 100. For example, the input device 132 may include a keypad for receiving the input data from the user.

The display 131 can display status information of the electronic device 100, a character input by the user, a moving picture, and a still picture, which are received from the processor unit 120, through the IO controller 130. For example, the processor 122 can display setting information corresponding to the visual presenter mode (the mode where the electronic device is mounted in the cradle and the electronic device scans the subject placed in the guide region of the guide frame and displays the scanned image in various manners) of the program running on the electronic device 100.

Similar to the input device 132, when the display 131 is configured as a touch screen, the touch screen can function as both the display 131 and the input device 132.

The hall sensor 137 can detect the magnetic force of the magnet 2022 of the mounting part 221 when the electronic device 100 is mounted in the cradle 200 and provide the detected information to the processor 122.

The proximity sensor 138 can detect an object within a certain range of the electronic device 100 and provide the detected information to the processor 122.

An image sensor 139, which is a component of the camera 1023, can capture an image of the subject in the guide region.

Figure 6:
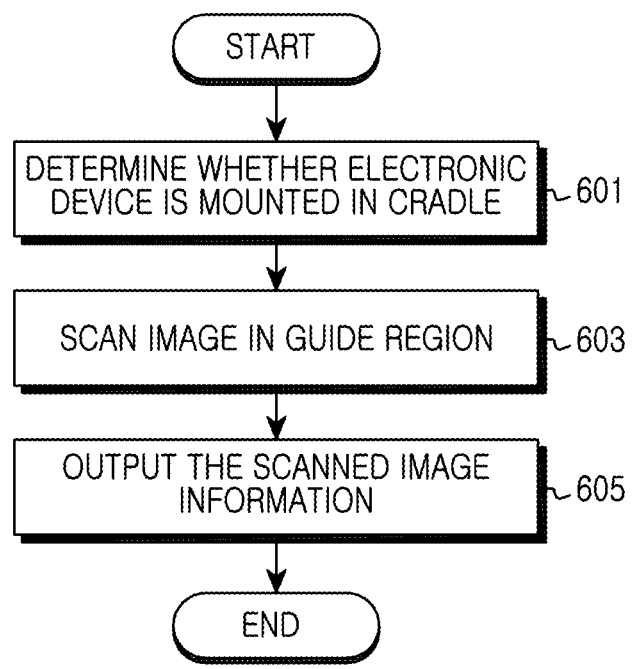
FIG. 6 is a flowchart of a method for processing an image scanned by the electronic device according to an embodiment of the present disclosure.

FIG. 6 is a flowchart of a method for processing the image scanned by the electronic device according to an embodiment of the present disclosure.

Referring to FIG. 6, the electronic device 100 determines whether it is mounted in the cradle 200 in operation 601. The electronic device 100 can determine whether the hall sensor 137 detects the magnetic force. When the electronic device 100 is mounted on the mounting part 2021 of the cradle 200, it can detect the magnetic force of the magnet of the mounting part 2021. In operation 603, the electronic device 100 can scan the image in the guide region 2051 of the guide frame 205 of the cradle 200. In operation 605, the electronic device 100 can output the scanned image or the scanned image information. The image information can be the information processed based on the scanned image. The processed information can include at least one of text information converted from the scanned image, voice data information converted from the text information, and color information compared with the reference color of the guide frame when the scanned image is the color and corrected based on the comparison. The corrected color information can include white balance information for the camera corrected using the guide frame as a gray card.

Now, how to output the scanned image information or the processed information of the scanned image information is elucidated.

Figure 7:
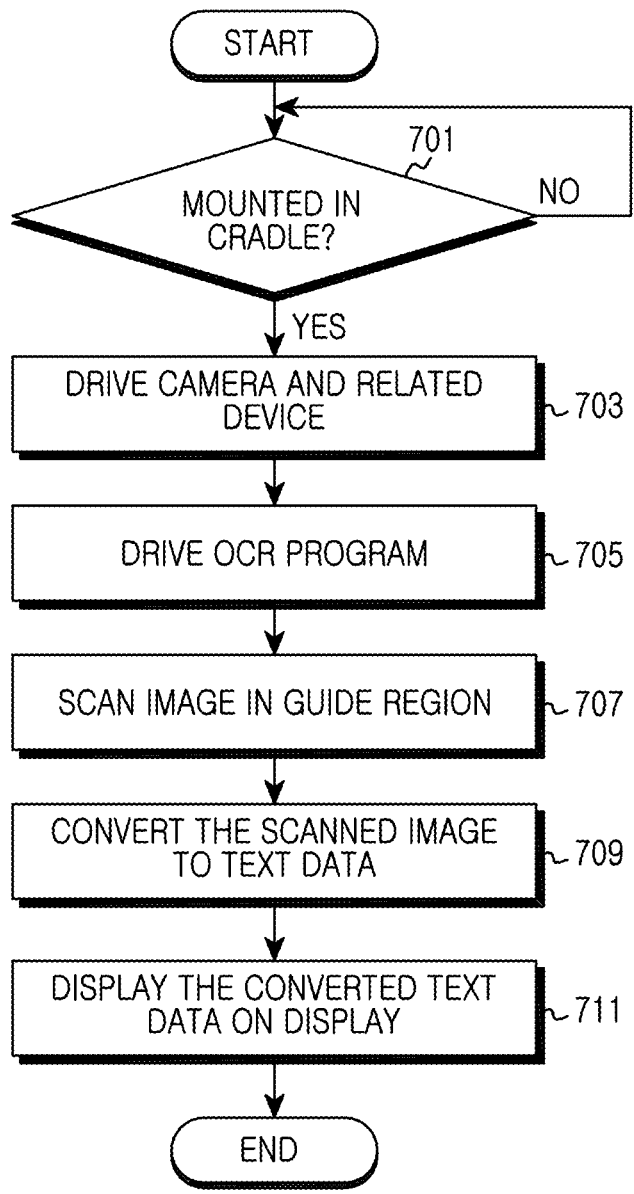
FIG. 7 is a flowchart of a method for processing an image scanned by the electronic device according to an embodiment of the present disclosure.

FIG. 7 is a flowchart of a method for processing the image scanned by the electronic device according to an embodiment of the present. disclosure Referring to FIG. 7, the electronic device 100 determines whether it is mounted in the cradle 200 in operation 701. The electronic device 100 can determine whether the hall sensor 137 detects the magnetic force to determine if it is mounted in the cradle. When the electronic device 100 is mounted on the mounting part 2021 of the cradle 200, it can detect the magnetic force of the magnet of the mounting part 2021.

When the electronic device 100 is mounted in the cradle 200 in operation 701, the electronic device 100 can drive the camera 1023 and any related device in operation 703. For example, the electronic device 100 can concurrently activate the ambient lighting device such as LED module 1024. The electronic device 100 may activate the camera 1023 and the display 1011 at the same time.

In operation 705, the electronic device 100 can run the OCR program. The OCR program can convert the text, if any, of the image scanned by the camera 1023 to the text data.

In operation 707, the electronic device 100 can scan the image in the guide region 2051 of the guide frame 205.

Figure 9A:
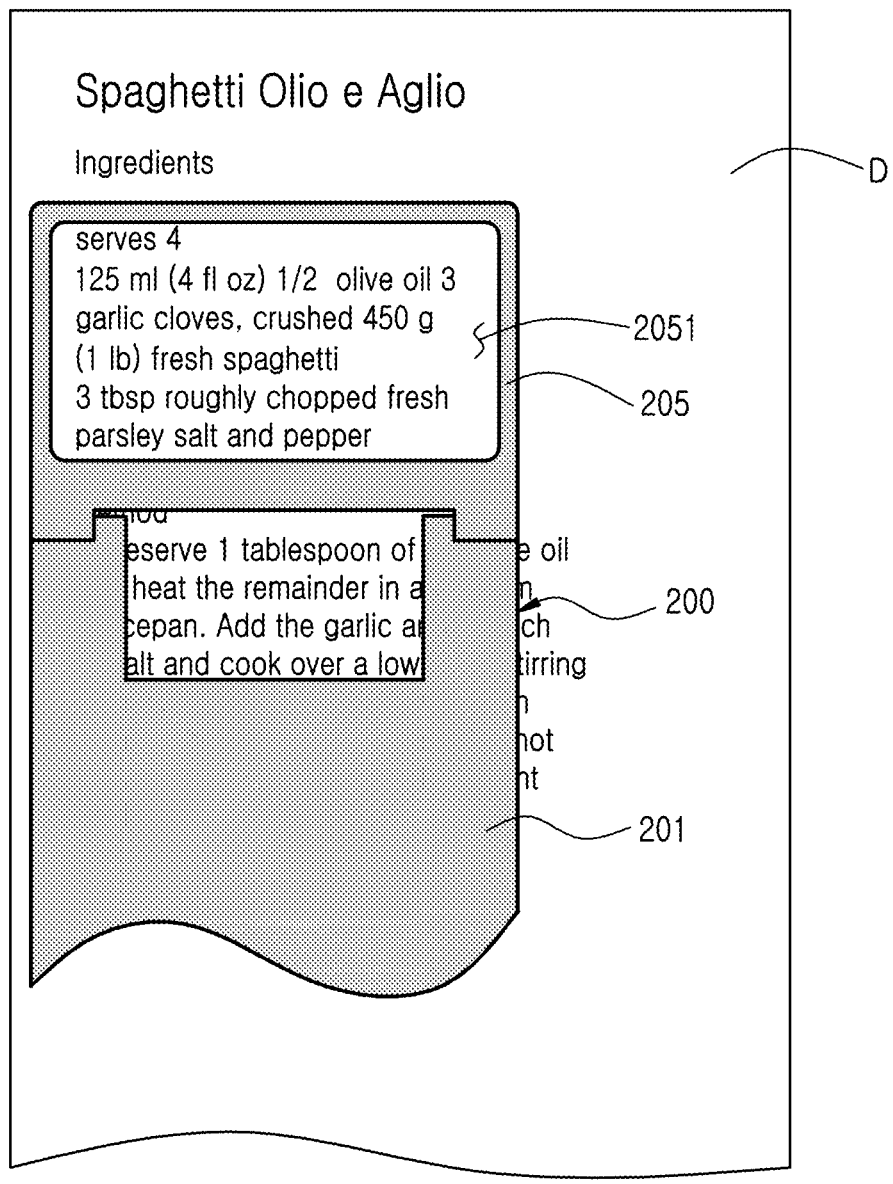
FIGS. 9A, 9B, and 9C are diagrams of the electronic device for scanning the image and displaying the scanned image according to an embodiment of the present disclosure.
Figure 9B:
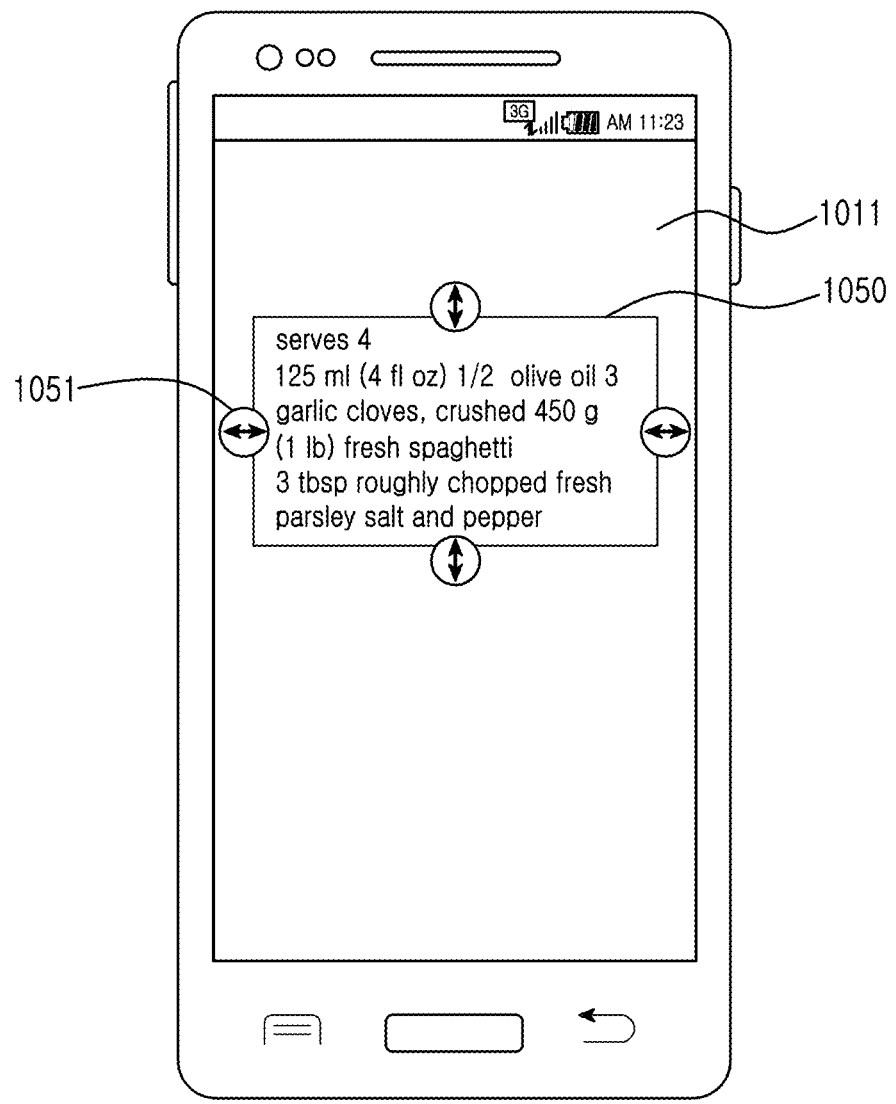
Figure 9C:
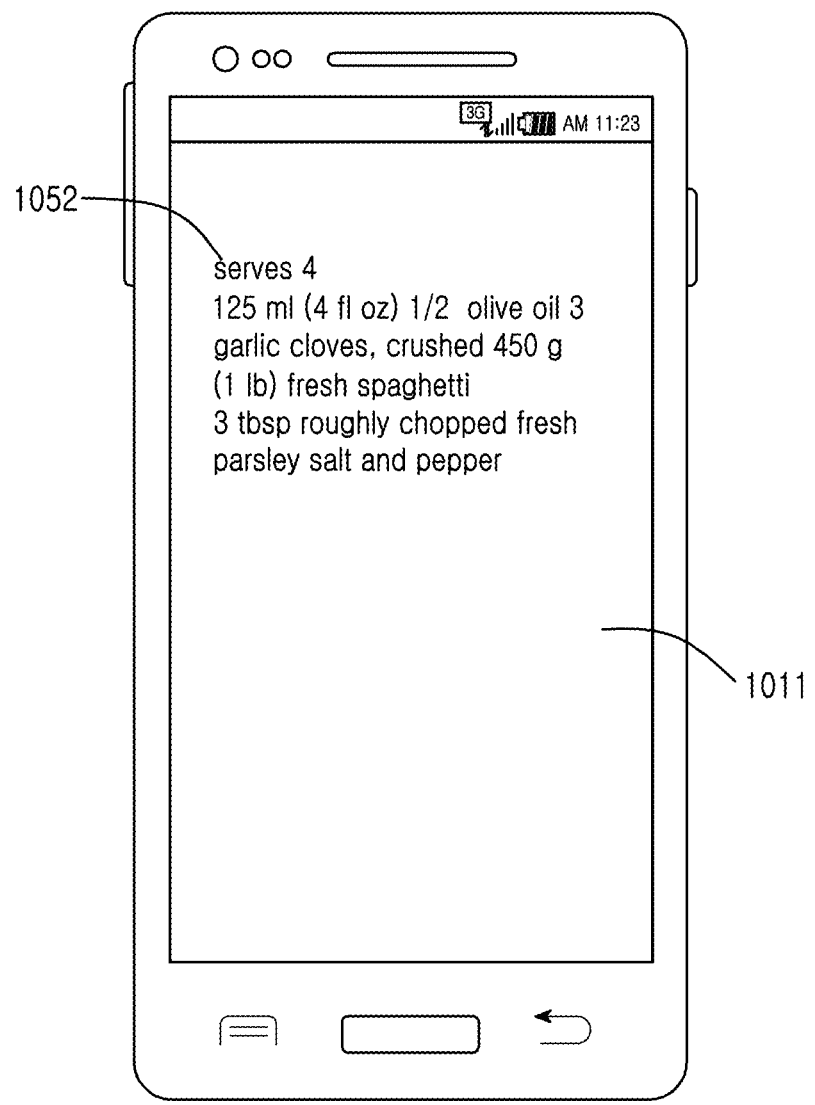

FIGS. 9A, 9B, and 9C are diagrams of the electronic device for scanning an image and displaying the scanned image according to an embodiment of the present disclosure.

Referring to FIG. 7 and FIG. 9A, the lower support 201 of the cradle 200 can be folded above a document D in operation 707 and moved vertically, horizontally, or in a certain direction by the user. As the cradle 200 moves, the image of the subject in the guide region 2051 can change. The electronic device 100 can scan the image changing based on the movement of the guide region 2051, in real time.

Referring to FIGS. 7 and 9B, the electronic device 100 may display the image scanned by the camera 1023 on the display 1011 in real time as shown. The displayed image data 1050 can be changed by touch input. An icon 1051 for zoom-in or zoom-out operations can be displayed at top, bottom, left, and right borders of the displayed image data 1050. The displayed image data 1051 may be shifted from a first region to a second region of the display 1011 according to the touch input.

Referring to FIGS. 7 and 9C, the electronic device 100 can convert the scanned image to the text data using the TTS conversion program in operation 709, and display the text data on the display in operation 711. As illustrated in FIG. 9C, the display 1011 displays text data 1052 from the TTS conversion program rather than the image data. The display text data 1052 can be stored in a data storage area of the memory according to the touch input. The display text data 1052 may be transmitted to other electronic device according to the touch input.

When the electronic device 100 is mounted in the cradle 200, the described operations can be performed automatically. Yet, the operations may be performed manually according to a user setting.

Figure 8A:
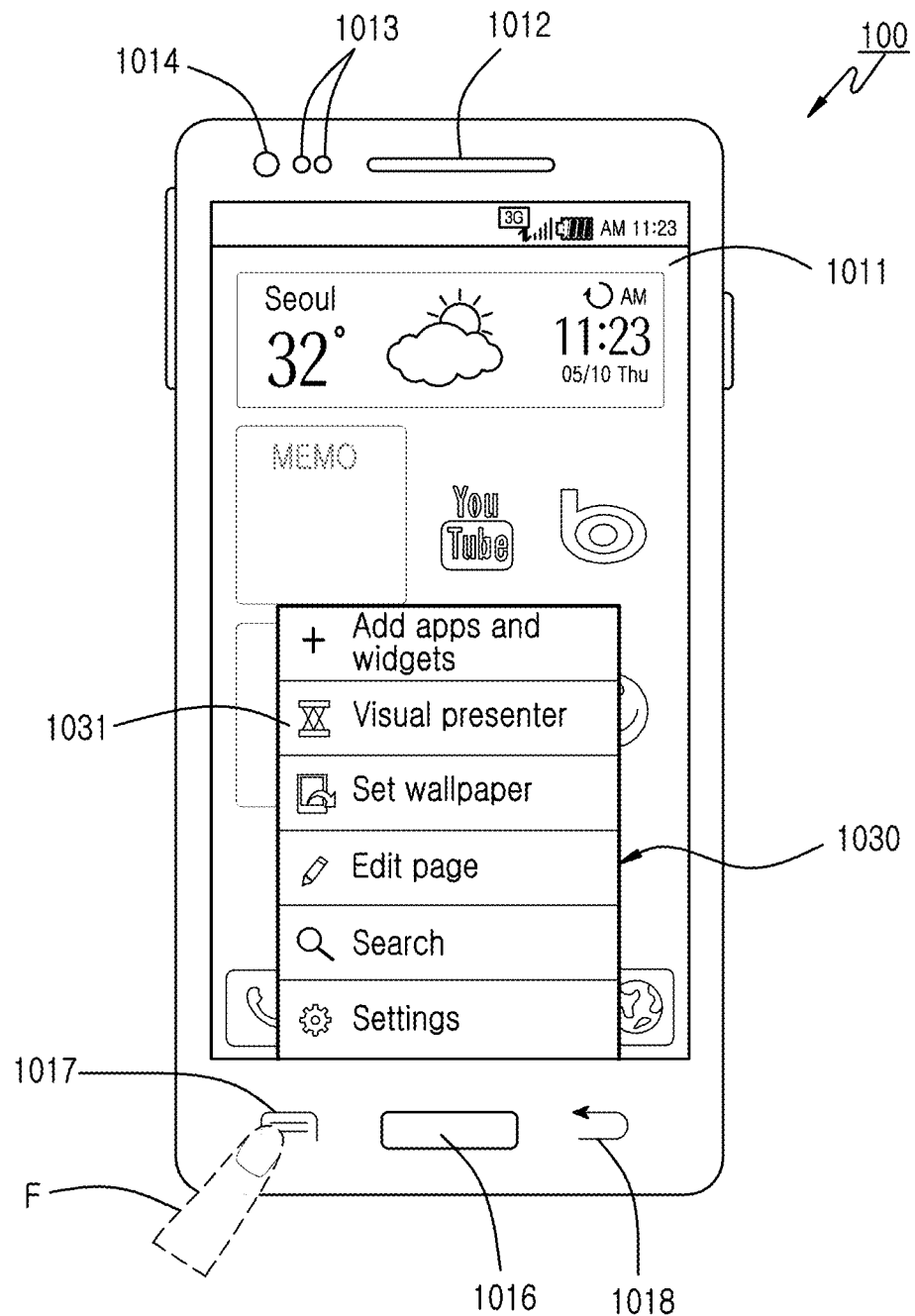
FIGS. 8A and 8B are diagrams of the electronic device for selecting a visual presenter function for the image processing according to an embodiment of the present disclosure.
Figure 8B:
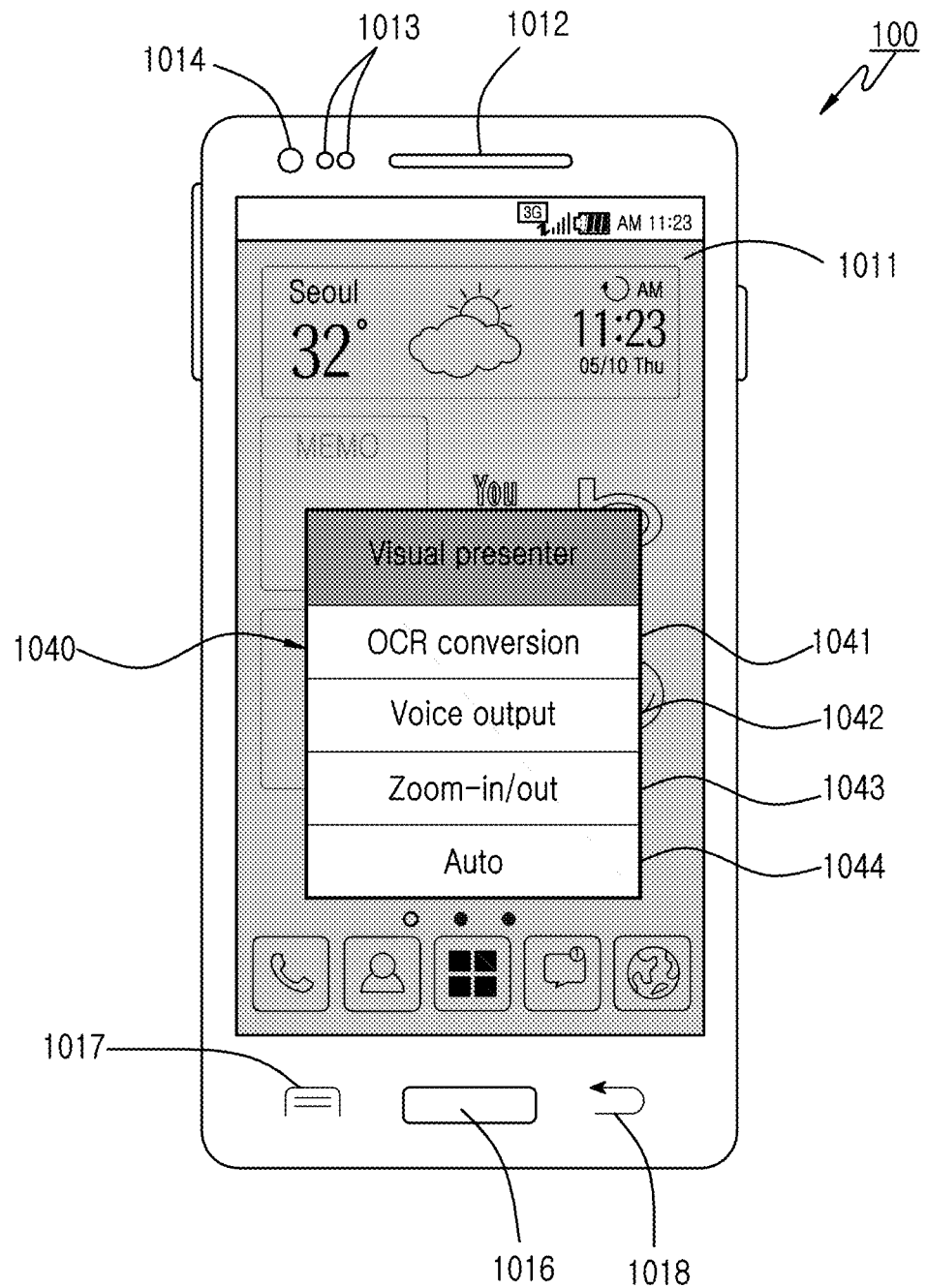

FIGS. 8A and 8B are diagrams of the electronic device for selecting the visual presenter function for the image processing according to an embodiment of the present disclosure.

Referring to FIGS. 8A and 8B, the user can set the visual presenter function or its detailed items by selecting a setting button 1017 disposed in the front side of the electronic device 100. The setting button 1017 or a cancel button 1018 can employ a soft touch key button or a physical key button.

When the setting button 1017 is pressed, the electronic device 100 can display a setting list 1031 on the display 1011. The setting list 1031 can include a plurality of setting items. When a visual presenter function item 1031 is selected on the setting list, a sublist 1040 of the visual presenter function item 1031 can be displayed as shown in FIG. 8B. The sublist 1040 can display a plurality of setting items 1041 through 1044.

The OCR conversion item 1041, which is a default function, can automatically conduct the OCR conversion when the electronic device 100 is mounted on the mounting part 2021 of the cradle 200.

The voice output item 1042, which is a default function, can automatically output TTS-converted voice data based on the text data converted from the image data using the OCR conversion when the electronic device 100 is mounted on the mounting part 2021 of the cradle 200.

The zoom-in/out item 1043 can magnify or demagnify the image displayed on the display 1011 when the electronic device 100 is mounted in the cradle 200. When the zoom-in/out item 1043 is selected, a selection item (not shown) for selecting the magnification power can be displayed. When the electronic device 100 is mounted on the mounting part 2021 of the cradle 200, the electronic device 100 scans the subject image in the guide region 2051 of the guide frame 205 and displays the scanned image on the display 1011 such that the image has a size corresponding to the magnification power selected in the zoom-in/out item 1043.

The auto item 1044 can select whether to execute the visual presenter function automatically or manually. When the auto item 1044 is selected, the image can be scanned merely by detecting the connection to the mounting part 2021 of the cradle 200. When the manual item is selected and the connection to the mounting part 2021 of the cradle 200 is detected, the electronic device 100 can display a popup window asking the user whether to scan the image. The auto item 1044 can switch between the auto mode and the manual mode.

Figure 10:
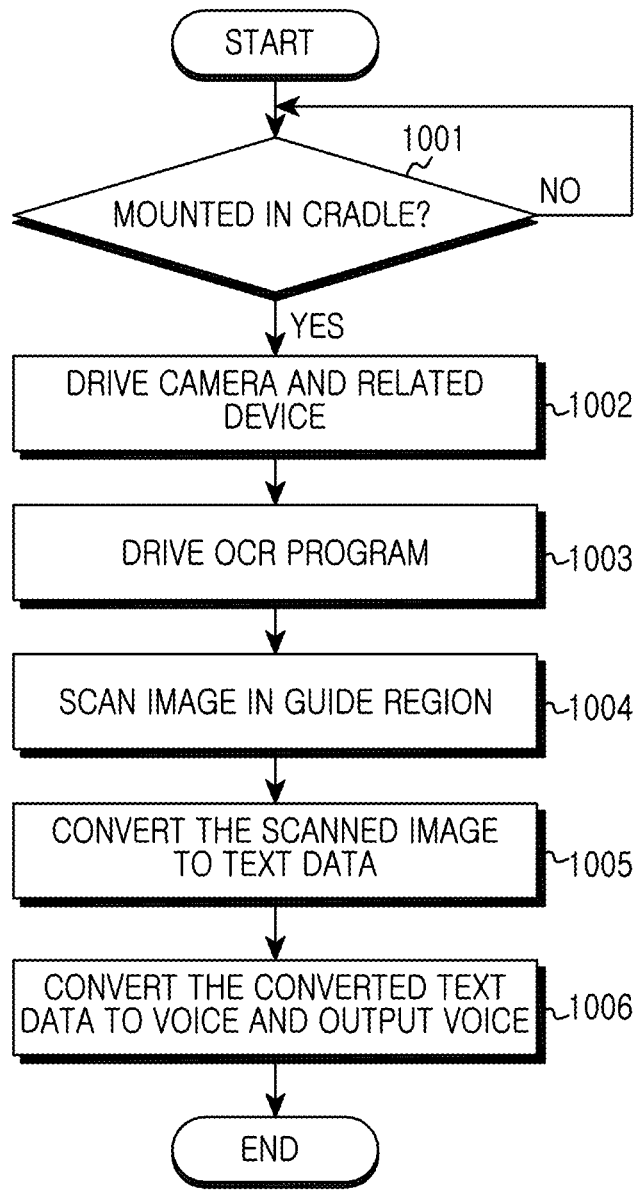
FIG. 10 is a flowchart of a method for processing the image scanned by the electronic device according to an embodiment of the present disclosure.

FIG. 10 is a flowchart of a method for processing the image scanned by the electronic device according to an embodiment of the present disclosure.

Referring to FIG. 10, the electronic device 100 determines whether it is mounted in the cradle 200 in operation 1001. The electronic device 100 can determine whether the hall sensor 137 detects the magnetic force. When the electronic device 100 is mounted on the mounting part 2021 of the cradle 200, it can detect the magnetic force of the magnet of the mounting part 2021.

When the electronic device 100 is mounted in the cradle 200 in operation 1001, the electronic device 100 can drive the camera 1023 and any related device in operation 1002. For example, the electronic device 100 can concurrently activate an ambient lighting device such as the LED module 1024. The electronic device 100 may activate the camera 1023 and the display 1011 at the same time.

In operation 1003, the electronic device 100 can run the OCR program. The OCR program can convert the text of the image scanned by the camera 1023 to the text data.

In operation 1004, the electronic device 100 can scan the image in the guide region 2051 of the guide frame 205, as described above with reference to FIGS. 9A and 9B.

Next, the electronic device 100 can convert the scanned image to the text data using the OCR program in operation 1005, and convert the text data to the voice data using the TTS conversion program in operation 1006. The electronic device 100 can display the text data or the image data while outputting the voice data.

Figure 11:
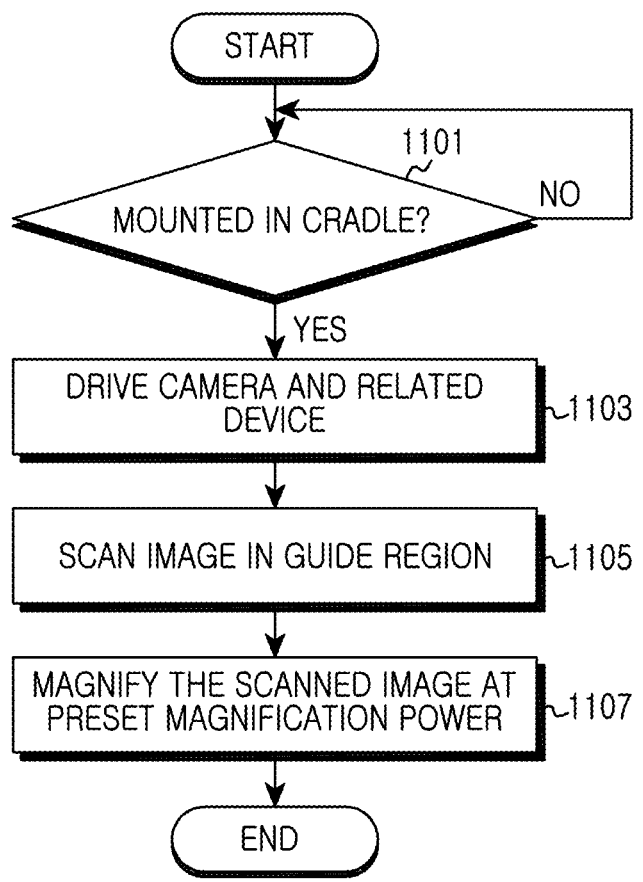
FIG. 11 is a flowchart of a method for processing the image scanned by the electronic device according to an embodiments of the present disclosure.

FIG. 11 is a flowchart of a method for processing the image scanned by the electronic device according to an embodiment of the present disclosure.

Referring to FIG. 11, the electronic device 100 determines whether it is mounted in the cradle 200 in operation 1101. The electronic device 100 can determine whether the hall sensor 137 detects the magnetic force. When the electronic device 100 is mounted on the mounting part 2021 of the cradle 200, it can detect the magnetic force of the magnet of the mounting part 2021.

When the electronic device 100 is mounted in the cradle 200 in operation 1101, the electronic device 100 can drive the camera 1023 and any related device in operation 1103. For example, the electronic device 100 can concurrently activate an ambient lighting device such as the LED module 1024. The electronic device 100 may activate the camera 1023 and the display 1011 at the same time.

After driving the camera 1023, the electronic device 100 can scan the image in the guide region 2051 of the guide frame 205 in operation 1105. In operation 1107, the scanned image can be displayed at the magnification power which is preset in the display 1011. For An example is described below with reference to FIG. 12.

Figure 12:
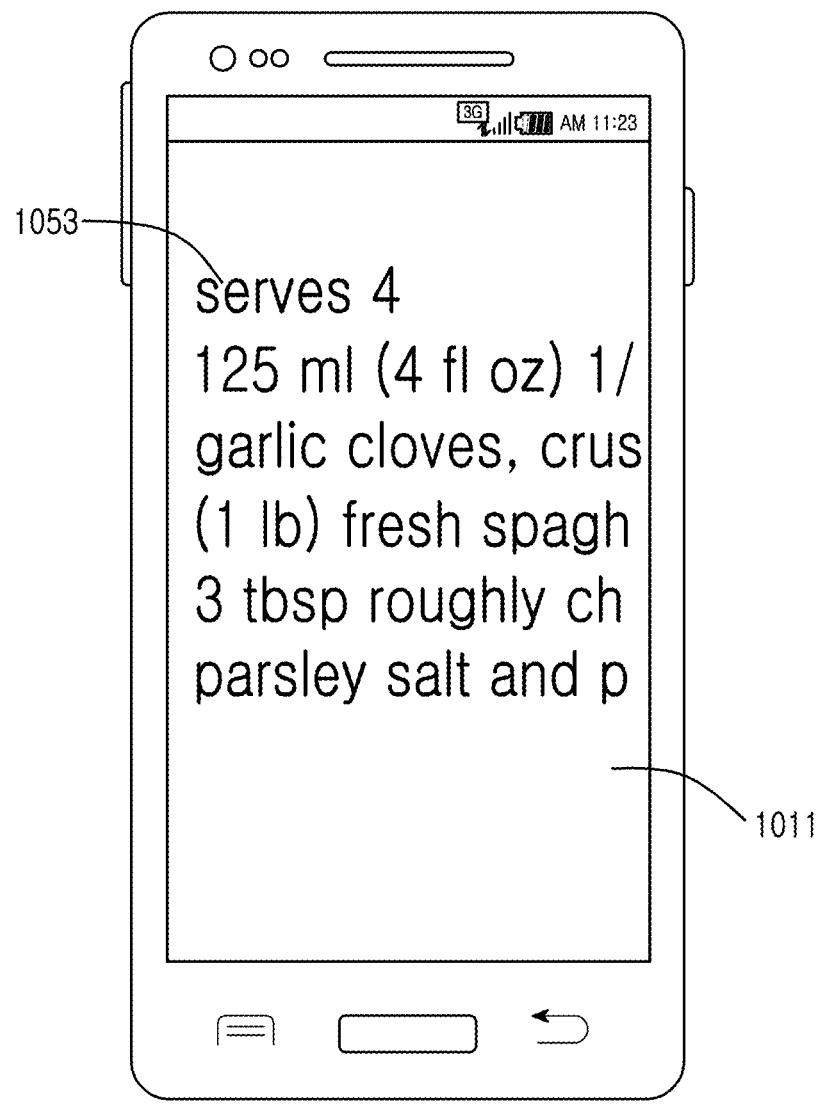
FIG. 12 is a diagram of the electronic device for magnifying the scanned image according to an embodiment of the present disclosure.

FIG. 12 is a diagram of the electronic device for magnifying the scanned image according to an exemplary embodiment of the present invention.

Referring to FIG. 12, the image in the guide region of FIG. 9A can be displayed on the display 1011 as the magnified image 1053.

Figure 13A:
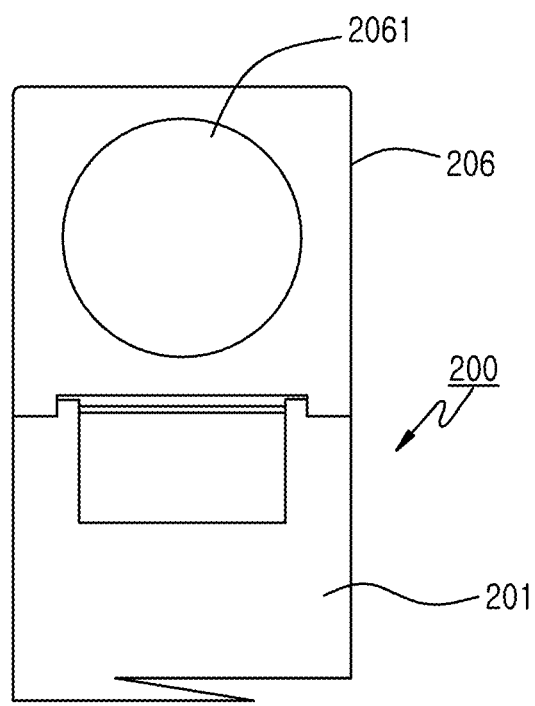
FIGS. 13A and 13B are diagrams of various guide frames applied to the electronic device according to an embodiment of the present disclosure.
Figure 13B:
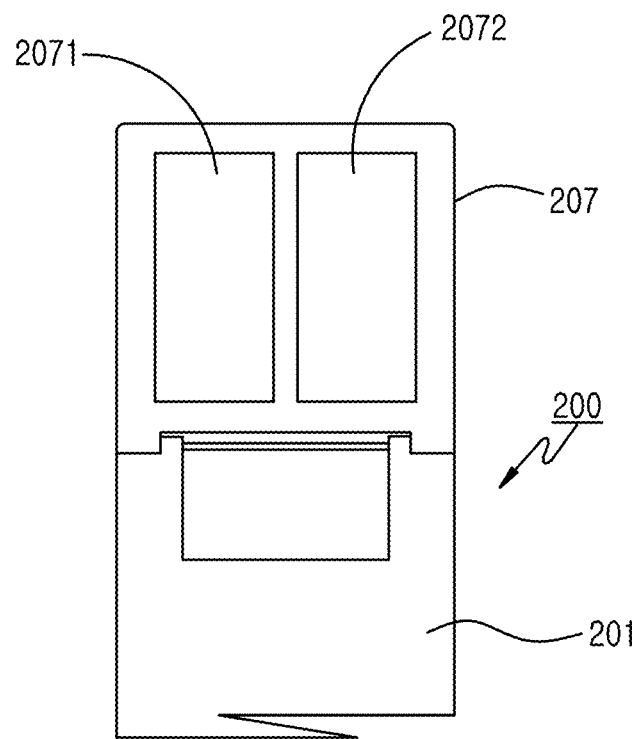

FIGS. 13A and 13B are diagrams of various guide frames applied to the electronic device according to an embodiment of the present disclosure.

The guide region of the guide frame can employ various shapes. The guide frame can be attached and detached to and from the lower support, and employ the guide frame including the guide region of various shapes.

As shown in FIG. 13A, a guide region 2061 of a guide frame 206 is changed from the rectangle to, but not limited to, the circle. A plurality of guide frames including the guide region of various shapes can be applied.

The guide region of a guide frame 207 of the lower support 201 can be divided into, but not limited to, two regions 2071 and 2072 as shown in FIG. 13B. The single guide frame may include a plurality of guide regions.

The guide region of the guide frame may not be formed in the rectangular shape. The guide region of the guide frame can include a closed step so that the user can place the subject on the closed step to image it. In this case, the electronic device can scan only the preset scanning area of the guide frame without having to sense the borders of the guide frame. The user can scan only the preset scanning area of the subject placed on the guide frame and display the scanned image on the display.

Figure 14:
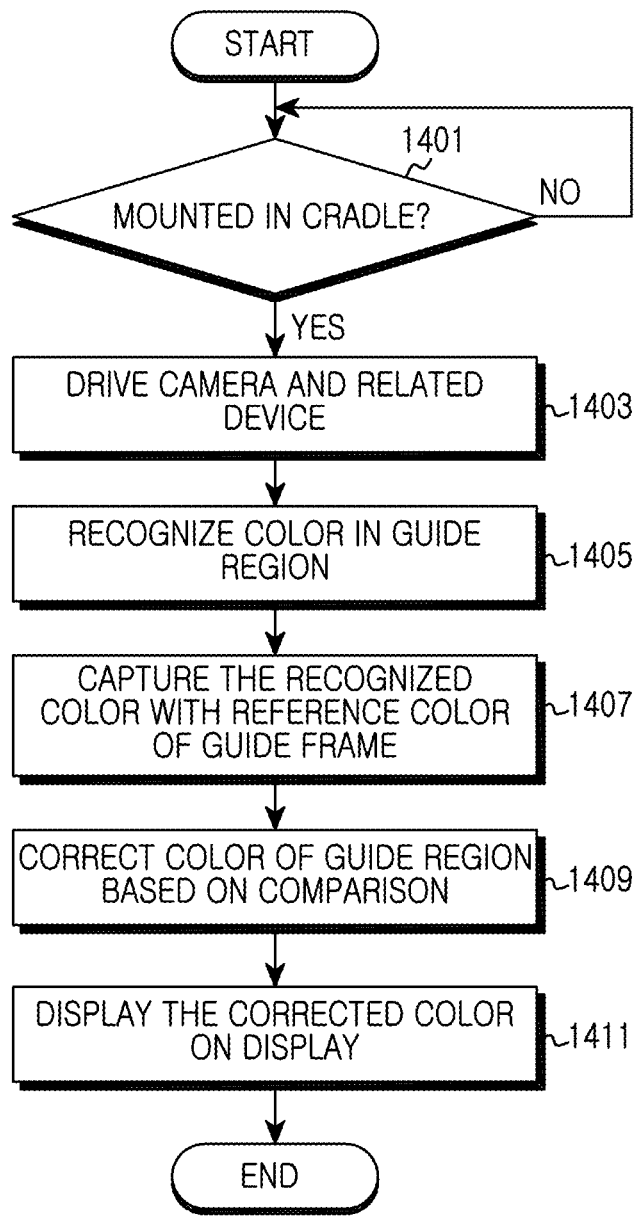
FIG. 14 is a flowchart of a method for correcting a color of the scanned image according to an embodiment of the present disclosure.

FIG. 14 is a flowchart of a method for correcting the color of the scanned image according to an embodiment of the present disclosure.

Referring to FIG. 14, the electronic device 100 can determine whether it is mounted in the cradle 200 in operation 1401. The electronic device 100 can determine whether the hall sensor 137 detects the magnetic force. When the electronic device 100 is mounted on the mounting part 2021 of the cradle 200, it can detect the magnetic force of the magnet of the mounting part 2021.

When the electronic device 100 is mounted in the cradle 200 in operation 1401, the electronic device 100 can drive the camera 1023 and any related device in operation 1403. For example, the electronic device 100 can concurrently activate an ambient lighting device such as the LED module 1024. The electronic device 100 may activate the camera 1023 and the display 1011 at the same time.

In operation 1405, the electronic device 100 can recognize the color of the guide region 2051 of the guide frame 205. In operation 1407, the electronic device 100 can compare the color of the guide region 205 obtained from the camera 1023 with the reference color of the guide frame 205. The electronic device 100 can correct the color of the guide region 2051 according to the comparison result in operation 1409 and display the corrected color on the display 1011 in operation 1411.

The electronic device 100 can compare the color of the guide region 2051 with the color of the guide frame 205, correct the recognized color based on the comparison, and set the white balance value. In so doing, the guide frame 205 can serve as the gray card.

As set forth above, the electronic device can easily process the image and provide the user with the output information. Therefore, the output information is helpful to the blind people or the illiterate, and the usability and the reliability of the electronic device can be enhanced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   determining whether the electronic device is mounted in a cradle comprising at least one guide region;
   automatically activating a camera and an Optical Character Reader (OCR) function in response to the determination that the electronic device is mounted in the cradle;
   scanning, by the camera, an image in the guide region;
   after scanning the image in the guide region, converting text of the scanned image into text data using the activated OCR function; and
   outputting, by a display, the scanned image or image information based on the scanned image.

2. The method of claim 1, wherein the determining of whether the electronic device is mounted in the cradle comprises receiving a signal from a sensor of the electronic device that detects a target of the cradle.

3. The method of claim 2, wherein the target includes a magnet and the sensor includes one of a hall sensor or a reed switch for detecting a magnetic force of the magnet.

4. The method of claim 1, further comprising:
   after converting the image to the text data, automatically converting the converted text data into voice data using a Text to Speech (TTS) function.

5. The method of claim 1, wherein the outputting of the scanned image or the image information based on the scanned image comprises:
   displaying a corresponding image or image information on the display of the electronic device.

6. The method of claim 5, wherein the displayed image or image information is resized and output in a preset size.

7. The method of claim 1, wherein the outputting of the scanned image or the image information comprises:
   audibly or tactually outputting data corresponding to the image information.

8. The method of claim 7, wherein the data is audibly output as voice or sound through a speaker and the data is tactually output as a vibration through a vibrator.

9. The method of claim 1, further comprising, after determining whether the electronic device is mounted in the cradle:
   confirming at least one of a distance between the camera and the guide region, an angle, an amount of light of a lighting device, a recognition range setting value, and a camera resolution setting value; and
   scanning the image in the guide region using the camera based on the confirmed information.

10. The method of claim 1, further comprising:
    when the scanned image is color data, comparing the scanned color data with a color of the guide frame of the cradle;
    correcting the scanned color data based on the comparison; and
    displaying the color data based on the correction on the display of the electronic device.

11. An electronic device comprising:
    a camera;
    a display; and
    a processor configured to:
       determine whether the electronic device is mounted in a cradle comprising at least one guide region,
       automatically activate a camera and an Optical Character Reader (OCR) function in response to the determination that the electronic device is mounted in the cradle,
       scan an image in the guide region using the camera,
       after scanning of the image, convert text of the scanned image into text data using the activated OCR function, and
       control the display to output the scanned image or image information based on the scanned image.

12. The electronic device of claim 11, further comprising:
    a speaker for audibly outputting information corresponding to the image information.

13. The electronic device of claim 11, further comprising:
    a vibrator for tactually outputting information corresponding to the image information.

14. The electronic device of claim 11, further comprising:
    a sensor configured to automatically scan the image by detecting a magnetic force of a magnet of the cradle.

15. The electronic device of claim 11, wherein the processor is further configured to convert the converted text data into voice data using a Text to Speech (TTS) function.

16. The electronic device of claim 11, wherein the cradle comprises:
    a lower support;
    a guide frame comprising at least one recessed guide region in the lower support;
    an upper support installed at a certain height from the lower support and comprising a mounting part for receiving the electronic device; and
    at least one leg for interconnecting the upper support and the lower support.

17. The electronic device of claim 16,
    wherein the guide frame is removeable,
    further comprising another guide frame comprising a recessed guide region having a different shape.

* * * * *